ARRANGEMENT FOR SELECTIVE TESTING OF SEARCH WIRES

Filed Feb. 28, 1966 3 Sheets-Sheet 1

Dec. 2, 1969 R. BRAUN ETAL 3,482,053

ARRANGEMENT FOR SELECTIVE TESTING OF SEARCH WIRES

Filed Feb. 28, 1966 3 Sheets-Sheet 2

United States Patent Office
3,482,053
Patented Dec. 2, 1969

3,482,053

ARRANGEMENT FOR SELECTIVE TESTING OF SEARCH WIRES

Reinhold Braun, Schwieberdingen, and Johann J. Puteick, Korntal, Germany, assignors to International Standard Electric Corporation, New York, N.Y., a corporation of Delaware Filed Feb. 28, 1966, Ser. No. 530,678
Claims priority, application Germany, Mar. 6, 1965, 1,278,535
Int. Cl. H04m 3/00
U.S. Cl. 179—18 6 Claims

ABSTRACT OF THE DISCLOSURE

A search wire system for selecting a path through an associated through-connecting network. The search wire system automatically provides the idle or busy condition of lines interconnecting the desired input and output through switching blocks comprising the through-connecting network responsive to receiving the input and output identification. The search in the search wire network is limited to search wires corresponding to lines interconnecting the desired input and output.

The invention relates to path selection systems and more particularly, to search wire systems for selecting paths through switching networks having regular intermediate line arrangements such as are used in telephone exchange systems.

In the above mentioned guide or search wire systems, it is known to use search wires running in parallel to the speech wires for exchange services. It is also known to store and indicate the busy or idle line condition of the intermediate lines through the use of operated or unoperated contacts arranged along such wires. For example, closed contacts are often used in such systems to indicate an idle line condition. When the intermediate lines are seized, the contacts are opened so that when subsequently checking, a fed-in current cannot pass over the wire; nor can an applied potential be passed through the wire.

In prior art systems, each time a connection is established, a selection is made among all the intermediate lines existing between two switching stages. An intermediate line linking two switching stages can be useless for establishing a connection for two reasons: first, it may already be busy; and second it may not lead to the destination desired. In the large switching networks, the second reason is more frequent than the first reason.

An object of the invention is to limit the necessity of checking the line condition of all of the intermediate lines and limiting the selection choice to the frequently low number of intermediate line links leading to the destination. Consequently, an object of the invention is to reduce the time used in path selecting in guide wire systems.

In switching networks with a regular intermediate line arrangement, the intermediate line links which are useless, because they do not lead to the required destination, can be indicated as a portion of the defined request to establish a connection. That is, the information items required for this indication can be derived from the input and the output address, thus eliminating the necessity of testing the useless lines.

The search wire system according to the invention does not check all intermediate lines. The line condition of only that part of the through-connecting network which may be used for a desired connection, is checked by a centralized search wire network. Based on the selection of the connecting paths in the search wire network the connection is established in the through-connecting network. In the search wire network only possible paths are checked for their line condition, and an idle path is selected from among the possible paths. The possible paths are known in systems using standardized intermediate line arrangements from the input and output number of the connection desired. Hence, it is possible to follow an established sequence in checking the search wires. Frequently used paths can then be led over a lesser number of switching stages and search wires can be assigned priorities based on the corresponding path in the through connecting network.

In order to consider all possible connections of the through-connecting network, it is important that an adequate number of the separately arranged search wires are provided so that a number of routes are possible from an input to any random output of the through-connecting network. In each search wire, there are a number of search wire switches which correspond to the number of intermediate leads between the switch equipped with the features mentioned, only a relatively small number of switches are required to select an available search wire. This fact is the more important if one considers that the expenditure of decoupling means in the selecting circuits known to the art increases exponentially with the number of the lines to be interrogated.

It is conventional to designate an exchange device as a switch block, in which each one of many inputs can be connected with each available output, independently of the busy or idle condition of other inputs and outputs. It is also conventional to designate connections between two switch blocks as intermediate lines. In the following description, the compact group of intermediate lines extending between two switching stages, connecting several switch blocks of the switching stage A with several switch blocks of the switching stage B, is marked as AB-route.

In cross point switching systems with a star circuitry, a single search wire is sufficient to check the possibility of making a connecting route between two terminal points. Each search wire contains a plurality of search wire switches (such as transistors), corresponding to one of the plurality of intermediate lines. All of these switches are switched in series to establish a connecting path through the switching network.

The search wire switches are actuated through seizing contacts, concentrated in matrices. A seizing contact is a contact of a relay associated to each intermediate line, which is operated when the intermediate line is seized. These contacts are concentrated in actuating matrices associated with the respective guide wire switch and the seizing contacts are mutually decoupled through a diode, preceding each of said contacts.

The possible routes through the switching network are defined and identified: (1) by the route numbers and the switch block numbers of the input; and (2) by the route numbers and the switch block numbers of the output. The seizing contacts are arranged in the matrices so that by designating the coordinates of the input and the output, the search wire switch is actuated via the seizing contacts. The intermediate lines of the search wire can be connected for the routes between those terminal points.

In the circuit arrangement according to the invention, the matrices are designed so that the seizing contacts of the first and of the last intermediate line sections in one coordinate (e.g. column) are arranged according to route numbers and in the other coordinate (e.g. row) the contacts of the intermediate lines are arranged according to the ordinal numbers of the intermediate leads in each route. Thus, all outgoing intermediate lines of the input switch blocks and all terminating intermediate lines of the output switch blocks are concentrated per switch block to common actuating lines. The seizing contacts of the intermediate line sections are arranged in one coordinate according to the route number of the previous line section, and in the other coordinate according to the route number of the following line section.

If the number of outgoing intermediate lines of the input switch block and/or terminating intermediate lines of the output switch block are less than the number of connecting routes or paths between two terminal points of the crosspoint arrangement, all of those intermediate lines which are not possible parts of a path are precluded from being marked through decoupling means between the route marking of the input and the switch block marking of the output and/or vice versa By this arrangement, only one seizing contact is operated in each matrix during a search wire switch through marking. The route and the switch block of the input and of the output through which the search wire is actuated depends upon the "intermediate line available" or "intermediate line busy" condition. Through the series connection of search wire switches, only such search wires are marked, which indicate an available connecting path through the entire switching network. Thus, one of the available search wires is selected through a comparatively small selecting circuit for through-connecting the paths.

Details of the invention will now be described with the aid of an exemplary search wire system circuit arrangement shown in the accompanying drawings; wherein:

FIG. 1 schematically shows a four-stage switching network;

Figure 1:
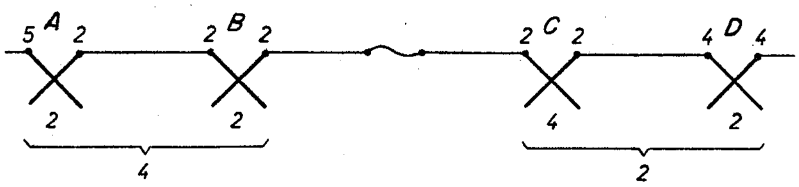
Figure 2:
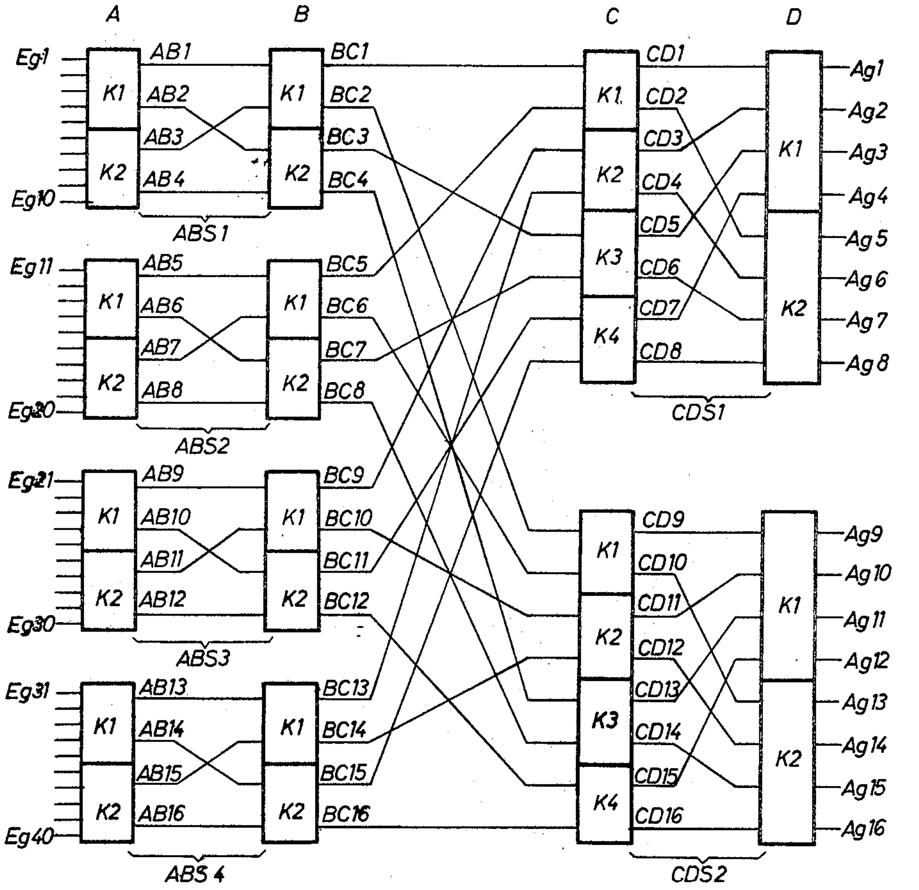
FIG. 2 shows the arrangement of the intermediate lines in the switching network according to FIG. 1.

The switching network, according to FIG. 1, contains four switching stages A, B, C, and D. As shown in FIG. 2 and indicated in FIG. 1 each switch block of the stage A possesses five inputs and two outputs, the switch blocks of the stages B and C each have two inputs and two outputs, and the switch blocks of the stage D each have four inputs and four outputs.

FIG. 2 shows the jumpering of the intermediate lines in the switching network according to FIG. 1. Each two switch blocks K1, K2 of the switching stage A and each two switch blocks K1, K2 of the switching stage B are always connected to a route AB. For example, the drawing shows an AB route ABS1, whereby a connecting path is possible between each input and each output of the AB route. Between the switching stages C and D two CD routes exist, and they are identified as CDS1 and CDS2. The entire switching network is equipped with a regular intermediate line arrangement. Two paths are provided between each of the inputs Eg1 to Eg40 and each of the outputs Ag1 to Ag16. These two paths always lead from one input via the same switch block of the switching stage A and via the same AB route, but via two different switch blocks of the switching stage B. Also both paths lead in any way via the same CD route and via the same switch block of the switching stage C. For the connection of the definite AB route with a definite CD route, two of the intermediate lines BC1 to BC16 are selected. Due to the mentioned regularity of the intermediate line arrangement, the testing of the busy or idle line condition and the path selection is limited to the maximum number of connecting possibilities in the search wire system used according to the invention.

For each possibility of a connection, a central search wire is provided; and for each intermediate line inserted in a connecting path, a search wire switch is provided. Thus, in our particular example, two search wires must be provided each with three series-connected search wire switches. The switch blocks are enumerated for each route. The intermediate lines between two switching stages are continuously coupled through routes.

Figure 3:
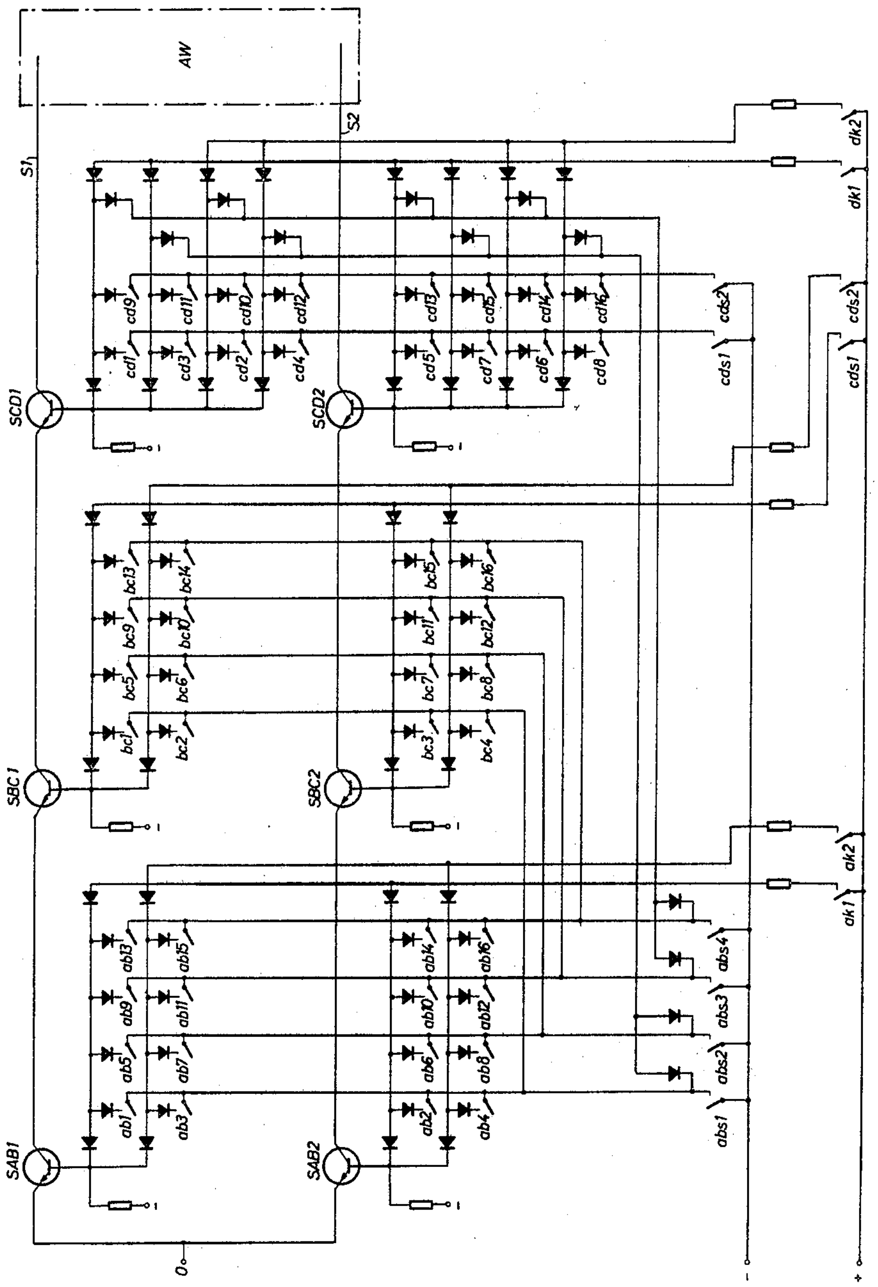
FIG. 3 shows the search wire network associated with the switching network of FIGS. 1 and 2 according to the invention.

As may be gathered from FIG. 3, seizing contacts AB1 to AB16; BC1 to BC16 and CD1 to CD16, are associated in a way known per se to the intermediate lines *ab*1 to *ab*16, *bc*1 to *bc*16 and *cd*1 to *cd*16. In the search wire system according to the invention, only the seizing contacts are released for a defined establishment of a connection to influence the actual line condition test. The search wires carry out the selection. In the example shown herein, the npn type transistors serve as search wire switches. The seizing contacts are opened if the intermediate line is available. They are decoupled, each through an individual diode. The individual rows of the matrices are also decoupled through individual diodes.

The circuit operates this way. For example, assume that a connection is to be established between the input E*g*20 and the output AG12 of the switching network according to FIG. 2. The input E*g*20 is located at the route ABS2 at the switch block K2 of the switching stage A. The switch block K1 is reached via the intermediate line AB7, and the switch block K2 of the switching stage B is reached via the intermediate line ABS. Since the output AG12 of the switching network is located in section CDS2 of route CD, the intermediate line BC6 of the switch block K1 of the switching stage B, AB route ABS2, and the intermediate line BCS from switch block K2, can be used to establish the connecting paths. The intermediate line BC6 leads into the switch block K1 of the switching stage C and the CD route CDS2, and the intermediate line BC8 leads into the switch block K3 of the switching stage C of said CD route CDS2. The connection between switch block K1 of the switching stage C and switch block K1 of the switching stage D is established in the CD route CDS2 with the intermediate line CD9, and the connection between the switch block K3 of the switching stage C and the switch block K1 of the switching stage D with the intermediate line CD13. For further description, it is assumed that of the intermediate lines in BC6 and BC8 the intermediate line BC8 is busy on an existing connection. Thus, the seizing contact *bc*8 in the matrix of the BC guide wire switch SBC2 is assumed to be closed.

For searching the route, the search wire network is actuated as follows: in the non-operative condition, the search wire switches are blocked. On the input end, the AB route marking switch *abs*2 and the switch block marking switch *ak*2 are closed. On the output end, the two CD route marking switches *cds*2 are closed. On the output end, the two CD route marking switches *cds*2 and the switch block marking switch *dk*1 are closed. The AB search wire switches SAB1 and SAB2 become conductive, because base current flows via the closed switch block marking switch *ak*2, and because the seizing contacts *ab*7 and *ab*8 are open in the corresponding rows of both matrices, as has been assumed previously. If the seizing contacts *ab*5 and *ab*6 had been closed, the row decoupling diodes connected to the base of the AB search wire switches SAB1 and SAB2 would be blocked. Thus, the switch operating process is not influenced by the operation of row contacts above. The BC search wire switch SBC1 also becomes conductive since base current can flow across one contact of the CD route marking switch *cds*2, and since the seizing contact *bc*6 is open.

The seizing contact *bc*8 is closed as assumed. The row decoupling diode connected to the base of said search wire switch is blocked via the second column of the matrix of the BC wire switch SBC2 since a negative potential is applied via the AB route marking switch *abs*2. Thus, the BC wire switch SBC2 remains blocked while BC wire switch SBC2 since a negative potential is applied via the AB route marking switch *abs*2. Thus, the BC search wire switch SBC2 remains blocked while BC search wire switch SBC1 becomes conductive.

Base current can flow through the contacts *dk*1 to make the CD search wire switches conductive via two rows (in our example the first and the second row) of the matrices of the CD search wire switches SCD1 and SCD2. Through the closed AB route marking switch *abs*2, negative potential is applied to the second and fourth row of both matrices of the CD search wire switch so that the line decoupling diodes of said rows are blocked. Since these diodes are connected with the base of the CD search wire circuit, no base current can flow across the rows. Since the seizing contacts *cd*9 and *cd*13 are open as assumed, the CD search wire switches SCD1 and SCD2 become conductive, despite the negative potential applied to the second column via the closed CD route marking contact *cds*2. Therewith, the search wire switches are actuated. In the search wire S1 all search wire switches are conductive, the connecting paths is available. In the search wire S2, the BC search wire switch SBC3 is blocked. Consequently, the connecting path is not available.

Figure 4:
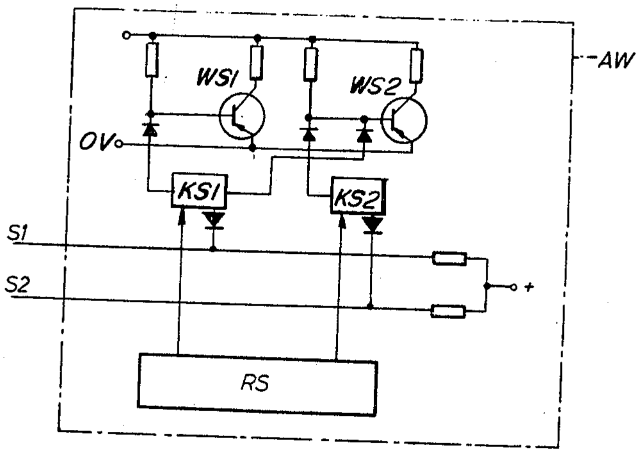
FIG. 4 shows an example of a selecting circuit.

Selection of an available connecting path is made with the aid of the selecting circuit AW. FIG. 4 shows an example of this selecting circuitry. A bistable trigger stage KS1 and KS2, respectively, is associated with each search wire S1, S2, A route switch WS1 and WS2 is associated with each trigger stage KS1, KS2, respectively. The paths have a fixed arrangement. Thus, to provide a priority of selection among several available routes, the route with the higher rank (e.g. with the lower search wire number) is always selected for the through-connection. To this end, the system uses both contrary signals furnished by the bistable trigger stages after actuation. Thereby the routes switch WS1 associated with the trigger stage having a higher priority trigger stage KS1 is rendered conductive and all other route switches of a lower rank (e.g. a higher route number) are blocked. Thus, these other switches cannot have an effect even if further bistable trigger stages are marked. FIG. 4 gives an example for two routes, but it can be extended to more routes also.

In the above example, in which the input E*g*20 is connected with the output A*g*12, the bistable trigger stage KS1 of the search wire S1 is brought into the marked position. The route switch WS1 becomes conductive, and the following route switches (in the use of several routes, all of the following route switches) are blocked independently or whether the bistable trigger stages of the following search wires not marked. In our example, through-connection is made on the first path which may be traced from input E*g*20 through intermediate line AB7, intermediate line BC6, and intermediate line CD9 to the marked output A*g*12.

Figure 5:
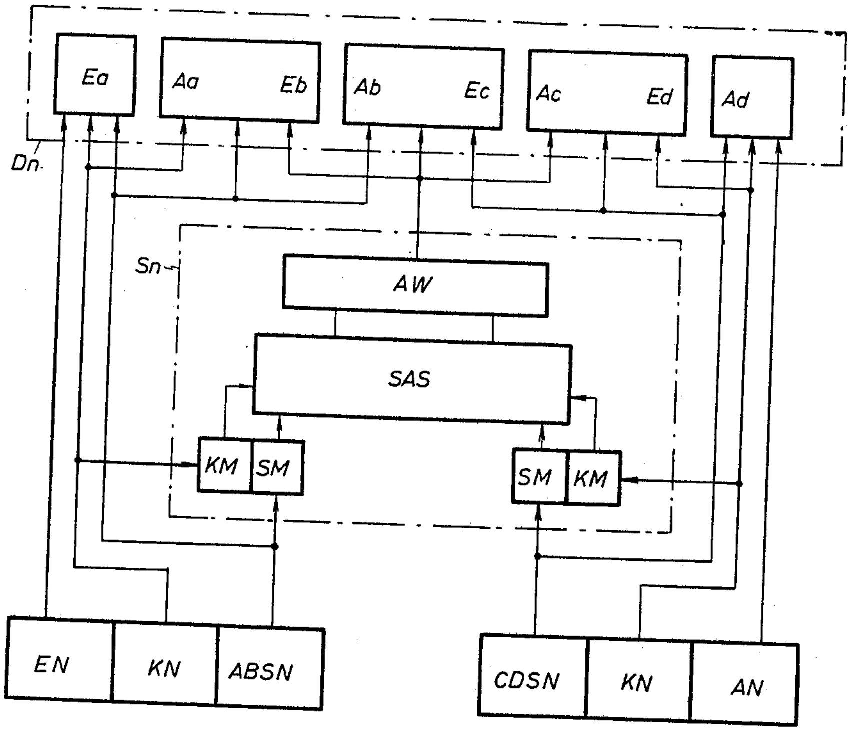
FIG. 5 shows a functional block diagram to explain the control tasks of the search wire system.

FIG. 5 shows the block diagram of a system including the entire switching network D*n* and search wire network S*n*. The number of the intermediate line and the input of the following switch block are determined by the output of a switch block. Therefore, a common actuation is sufficient for selecting the output of one and the input of the next following switch block in the through-connecting network. This is indicated in FIG. 5 by the common thick lining of an output (e.g. output A*s*) and the next following input (e.g. input E*b*). Of the entire through-connecting network, only the input E*a* and the output A*d* must always be actuated individually. One crosspoint is defined by the input and the output of the switch block.

The actuation of the inputs and ouputs of the switch blocks is made through three co-ordinates. The input numerals and the output numerals of the switching network are subdivided into AB route numbers ABSN, and CD route numbers CDSN, switch block number KN and input number EN or output number AN respectively of the switch block. The switch block number KN and the input EN and the output number AN respectively, are thereby not enumerated over all routes, but serve only as further limitations for the number of the AB route ABSN and for the number of the CD route CDSN, respectively. The input E*a* and the output A*d* of the through-connecting network are marked by these three co-ordinates. The output A*a* of stage A and the input E*b* of the stage E*d*, as well as the output A*c* of stage C and the input E*d* of stage D, are pre-marked by the corresponding route number ABSN and CDSN respectively, and the switch block number KN, while the output A*b* of stage B and the input E*c* of stage C are pre-marked inputs and outputs, the route number of the selecting circuit AW is added, which is limited, in switching networks with a star-type circuit arrangement, to only one possible connecting path by the indication: "route available."

The marking in the through-connecting network D*n* is made parallel to the marking in the search wire network S*n*, where the switch block marking switches KM and the route marking switches SM block or render conductive the search wire switches SAS, depending on the line condition of the intermediate lines. If a path is available, the connection between the terminal points may be through-connected almost immediately after inserting the information via the input and the output.

While the principles of the invention have been described above in connection with specific apparatus and applications, it is to be understood that this description is made only by way of example and not as a limitation on the scope of the invention.

What is claimed is:

1. In a search wire circuit arrangement for selecting preferred ones of available paths between random inputs and outputs through switching networks having regularly arranged intermediate lines which may be connected in cascade by a plurality of switching stages comprised of switching blocks to form said preferred paths, said search wire circuit arrangement comprising: a plurality of search wires corresponding to paths through said switching network, a plurality of seizing contact means for individually indicating the busy or idle conditions of each of said paths, limiting means for limiting the selection of the search wires of the search wire circuit arrangement to those search wires which correspond to the portion of the switching network in which a connection is to be established between one of said random inputs and a desired output, said search wires comprising search wire sections, search wire switch means serially placed in said search wires to join said sections to form said search wires, there being only one first search wire switch means for each of said search wires corresponding to the lines between the first two switching stages and only one least search wire switch means for each of said search wires corresponding to the lines between the last two switching stages, and only one intermediate search wire switch means on each of said search wires corresponding to the lines between the second switching stage and the penultimate switching stage, said limiting means including first stage switch block marking switch means corresponding to all switch blocks of the same kind in the first switching stage, and last stage switch block marking switch means corresponding to all switch blocks of the same kind of the last switching stage, means responsive to the operation of said first and last stage switch block marking switch means for operating the first and the last search wire switch means respectively in said search wires, route marking switch means corresponding to each set of said lines which interconnect the switching blocks of said first two switching stages and said last two switching stages, means responsive to the operation of said route marking switch means for operating the intermediate wire switch means, further means responsive to the operation of said route marking switch means for preparing blocking paths through said seizing contact means which prevent the operation of said search wire switch means for each of said search wires corresponding to busy ones of said lines, means for operating one first stage and one last stage switch block marking switch means during the preselection of the first and the last switching stage, means for operating said route marking switch means during the preselection of the first and last switching stage, whereby said search wire switches are operated responsive to the operation of said switch block marking switch means and route marking switch means to form search wire corresponding to the available paths only if none of the plurality of seizing contact means indicating the busy or idle conditions of each of said lines is operated and priority means for selecting one of said search wires corresponding to a preferred path between the available paths.

2. The circuit arrangement according to claim 1 characterized in that the search wires corresponding to the paths available is equal to the maximum number of paths from a random input to a random output of the switching network and that there are as many search wire switches arranged in the search wires to correspond to the number of intermediate lines between the switching blocks of the switching stages in the switching network that may be used to connect the random input to the random output, and wherein the seizing contacts control the search wire switches but are separated from the search wires.

3. A circuit arrangement according to claim 2, characterized in this that the seizing contacts in the operating circuit of the search wire switches are arranged like matrices, that the seizing contacts of the first and the last intermediate line section in one of the coordinates are concentrated according to the route numbers and in the other coordinate, according to the ordinal number of the intermediate lines in each route, that this coordinate like operation leads via route marking switches and switch block marking switches, and that all outgoing intermediate lines of the input switch blocks and all terminating intermediate lines of the output switch blocks are again concentrated per switch block to common control lines.

4. A circuit arrangement according to claim 2, characterized in this that the seizing contacts of the intermediate lines between the centre switching stages in one coordinate are arranged, according to the route number of the preceding line section, and in the other coordinate, according to the route numbers of the following line section.

5. A circuit arrangement according to claim 2, for switching networks with more outgoing intermediate lines of the input switch block and/or terminating intermediate lines of the output switch block as connecting paths between two terminal points of the through-connecting network, characterized in this that the route marking of the input and the switch block marking of the output and/or vice versa are mutually coupled.

6. A circuit arrangement according to claim 2 characterized in this that frequently used paths are led through a small number of switching stages and that corresponding search wires are arranged corresponding to the frequently used paths, and said priority means giving preference to said corresponding search wires.

References Cited

UNITED STATES PATENTS

| | | | |
|---|---|---|---|
| 3,175,043 | 3/1965 | Jabczynski et al. | 179—22 |
| 3,180,940 | 4/1965 | Korber. | |

WILLIAM C. COOPER, Primary Examiner